US010263787B1

(12) United States Patent
Gelman et al.

(10) Patent No.: US 10,263,787 B1
(45) Date of Patent: Apr. 16, 2019

(54) SCALABLE AUTHENTICATION FOR DECENTRALIZED APPLICATIONS

(71) Applicant: CyberArk Software Ltd., Petach-Tikva (IL)

(72) Inventors: Alex Gelman, Petach-Tikva (IL); Dor Simca, Oranit (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/186,914

(22) Filed: Nov. 12, 2018

(51) Int. Cl.
  *H04L 29/06* (2006.01)
  *H04L 9/32* (2006.01)
  *H04L 9/30* (2006.01)
  *H04L 9/08* (2006.01)

(52) U.S. Cl.
  CPC ............ *H04L 9/3247* (2013.01); *H04L 9/30* (2013.01); *H04L 9/0861* (2013.01); *H04L 2209/38* (2013.01)

(58) Field of Classification Search
  CPC ..... H04L 9/3247; H04L 9/30; H04L 2209/38; H04L 9/0861
  See application file for complete search history.

(56) References Cited

U.S. PATENT DOCUMENTS

| 9,635,000 | B1* | 4/2017 | Muftic | H04L 63/0435 |
| 2011/0255696 | A1* | 10/2011 | Ma | H04L 9/083 |
| | | | | 380/279 |
| 2013/0166907 | A1* | 6/2013 | Brown | H04L 9/3265 |
| | | | | 713/156 |
| 2014/0082353 | A1* | 3/2014 | Everhart | G06F 21/33 |
| | | | | 713/158 |
| 2014/0310787 | A1* | 10/2014 | Morley | H04L 63/0884 |
| | | | | 726/6 |
| 2017/0257213 | A1* | 9/2017 | Li | H04L 9/32 |
| 2017/0357496 | A1* | 12/2017 | Smith | G06F 8/65 |
| 2018/0167198 | A1* | 6/2018 | Muller | G06F 21/16 |
| 2018/0198628 | A1* | 7/2018 | Hojsik | G06F 21/44 |
| 2018/0336554 | A1* | 11/2018 | Trotter | G06Q 20/3823 |

OTHER PUBLICATIONS

Wikipedia, Web of trust, accessed Nov. 12, 2018 at https://en.wikipedia.org/wiki/Web_of_trust (7 pages).
Wikipedia, Self-signed certificate, accessed Nov. 12. 2018 at https://en.wikipedia.org/wiki/Self-signed_certificate (3 pages).
Wikipedia, Mutual authentication, accessed Nov. 12, 2018 at https://en.wikipedia.org/wiki/Mutual_authentication (2 pages).

* cited by examiner

*Primary Examiner* — Chau Le
(74) *Attorney, Agent, or Firm* — Finnegan, Henderson, Farabow, Garrett & Dunner, LLP

(57) ABSTRACT

Disclosed embodiments relate to decentralized and scalable trust among a plurality of decentralized applications. Techniques include receiving, at a first decentralized application, a signature associated with a first public key, receiving data representing one or more permissions specified by a trusted root application and signed by the trusted root application, signing a second public key associated with a second decentralized application, signing data representing one or more permissions specified by the first decentralized application, and providing the signature associated with the second public key and the signed data representing one or more permissions specified by the first decentralized application, in order to thereby provide trust between the first decentralized application and the second decentralized application.

22 Claims, 11 Drawing Sheets

900

901

```
{
  "id" : 222456789,
  "permissions" : ["Read", "Copy"],
  "public_key" : "ajddakj2sdf2333409sdm09fj0204uadma=",
  "parent" : {
     "id" : 123456789,
     "permissions" : ["Read", "Write"],
     "public_key" : "kldsafkjv423nkdauirhf123v213j213absf==",
     "parent" : {},
     "parent_signature" : ""
  },
  "parent_signature" : "jafs89jf29jh9wvcn39qh182nf29"
}
```

FIG. 9

SCALABLE AUTHENTICATION FOR DECENTRALIZED APPLICATIONS

BACKGROUND

Many modern network systems are built on the combined functionality of multiple applications. The applications may be standalone, discrete programs, or may take the form of microservices, which are applications dedicated to performing a specific task. For example, to support a social media hosting website, applications may perform tasks such as media upload and download, behavioral tracking, advertising, payments and e-commerce, privacy controls, integrated widgets and plugins, and many more. Similarly, each of these functions may have several applications or microservices dedicated to performing individual sub-functions.

In order for a collection of applications to communicate with each other in the performance of an overall function or service, the applications often need to communicate with each other. To communicate securely, applications often must authenticate one another. For example, authentication may involve one application providing an agreed upon secret (e.g., symmetric or asymmetric encryption key, password, token, etc.) to another application, which can then be validated. Ideally, each application should have its own unique secret, so that authentication may be performed on an application-specific basis.

In large systems composed of many individual applications, it becomes difficult to manage and distribute secrets across each application. This is challenging in the deployment of applications, since creating numerous individualized secrets can be tough to perform on a rapid and traceable basis. It is also challenging in the administration, since such secrets must be tracked and potentially refreshed or replaced periodically. These challenges are compounded in dynamic network environments, such as cloud computing environments or continuous deployment workflows, where applications are quickly and often unpredictably being instantiated and utilized. For example, where applications are deployed to meet changes in system load, changes in performance requirements, or changes based on suspected cybersecurity attacks, creating and managing unique secrets for each application can be a daunting problem.

Accordingly, in view of these and other deficiencies in existing techniques, technological solutions are needed for more efficient, flexible, and secure ways of providing secure authentication among different applications (e.g., microservices or other applications). Such solutions should be simple and lightweight, so as not to require undue processing power or time in the creation and management of authentication information. In addition, such solutions should be highly scalable, so that performance and security are not degraded when only a few, or numerous, instances of applications are operating together. Further, it may be advantageous for such solutions to not rely on external, third-parties to perform authentication, since this may lead to performance decreases as well as security vulnerabilities. In addition, it may be advantageous for such solutions to be automatic from the perspective of operations teams, cloud orchestration tools, the applications themselves, and the other applications in the same communications ecosystem.

SUMMARY

The disclosed embodiments describe non-transitory computer readable media, systems, and methods for decentralized and scalable trust among a plurality of decentralized applications. For example, in an exemplary embodiment, there may be a non-transitory computer readable medium including instructions that, when executed by at least one processor, cause the at least one processor to perform operations for decentralized and scalable trust among a plurality of decentralized applications. The operations may comprise receiving, at a first decentralized application, a signature associated with a first public key, the signature being created by a trusted root application; receiving, at the first decentralized application, data representing one or more permissions specified by the trusted root application and signed by the trusted root application; wherein the one or more permissions specified by the trusted root application define one or more access rights of the first decentralized application; signing, at the first decentralized application, a second public key associated with a second decentralized application; signing, at the first decentralized application, data representing one or more permissions specified by the first decentralized application; wherein the one or more permissions specified by the first decentralized application define one or more access rights of the second decentralized application; and providing the signature associated with the second public key and the signed data representing one or more permissions specified by the first decentralized application, in order to thereby provide trust between the first decentralized application and the second decentralized application.

According to a disclosed embodiment, the data representing one or more permissions specified by the trusted root application are identified in a token provided by the trusted root application.

According to a disclosed embodiment, the token further contains the signature associated with the first public key signed by the trusted root application.

According to a disclosed embodiment, the operations further comprise identifying, at the first decentralized application, a request for authentication of the second decentralized application.

According to a disclosed embodiment, the operations further comprise identifying, at the first decentralized application, a need for the second decentralized application to exist.

According to a disclosed embodiment, the data representing one or more permissions specified by the trusted root application are a subset of permissions of the trusted root application.

According to a disclosed embodiment, the data representing one or more permissions specified by the first decentralized application are a subset of permissions of the first decentralized application.

According to a disclosed embodiment, the trusted root application is configured to determine whether to trust the first decentralized application before signing the first public key.

According to a disclosed embodiment, the first decentralized application is configured to determine whether to trust the second decentralized application before signing the second public key.

According to a disclosed embodiment, the operations further comprise generating, at the first decentralized application, the second public key.

According to a disclosed embodiment, the operations further comprise receiving, at the first decentralized application from a source external to the first decentralized application, the second public key.

According to a disclosed embodiment, the operations further comprise generating a token specifying: the second public key and the data representing one or more permissions specified by the first decentralized application.

According to a disclosed embodiment, the first decentralized application and second decentralized application are part of a chain of trust, and the chain of trust does not include certain other decentralized applications from the plurality of decentralized applications.

According to another disclosed embodiment, a method may be implemented for decentralized and scalable trust among a plurality of decentralized applications. The method may comprise receiving, at a first decentralized application, a signature associated with a first public key, the signature being created by a trusted root application; receiving, at the first decentralized application, data representing one or more permissions specified by the trusted root application and signed by the trusted root application; wherein the one or more permissions specified by the trusted root application define one or more access rights of the first decentralized application; signing, at the first decentralized application, a second public key associated with a second decentralized application; signing, at the first decentralized application, data representing one or more permissions specified by the first decentralized application; wherein the one or more permissions specified by the first decentralized application define one or more access rights of the second decentralized application; and providing the signature associated with the second public key and the signed data representing one or more permissions specified by the first decentralized application, in order to thereby provide trust between the first decentralized application and the second decentralized application.

According to another disclosed embodiment, the first decentralized application is configured to receive an authentication request from the second decentralized application.

According to another disclosed embodiment, the authentication request includes the signed second public key and the signed data representing one or more permissions specified by the first decentralized application.

According to another disclosed embodiment, the method further comprises validating the signature associated with the second public key.

According to another disclosed embodiment, the method further comprises determining, based on the validating, whether to authenticate the second decentralized application.

According to another disclosed embodiment, the data representing one or more permissions specified by the trusted root application are identified in a first token provided by the trusted root application.

According to another disclosed embodiment, the method further comprises generating a second token specifying: the second public key and the data representing one or more permissions specified by the first decentralized application.

According to another disclosed embodiment, the method further comprises validating, at the first decentralized application, the first token and the second token.

According to another disclosed embodiment, the first decentralized application and second decentralized application are part of a chain of trust, and wherein the chain of trust does not include certain other decentralized applications from the plurality of decentralized applications.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 9 is an exemplary depiction of a second trust token with certain permissions, in accordance with disclosed embodiments.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for decentralized and scalable trust among a plurality of decentralized applications described herein overcome various deficiencies in prior security approaches. According to disclosed embodiments, authentication credentials may be generated and provided in a lightweight and decentralized chaining process from one application to another. Such a process does not require a centralized authentication authority to provide and track credentials. Further, the disclosed techniques may be transparent to operations teams, the participating applications and the applications they communicate with, and identities invoking the applications. The disclosed embodiments are also highly tailorable and customizable, since different permissions may be granted to different applications on an as-needed basis.

Reference will now be made in detail to the disclosed embodiments, examples of which are illustrated in the accompanying drawings.

Figure 1:
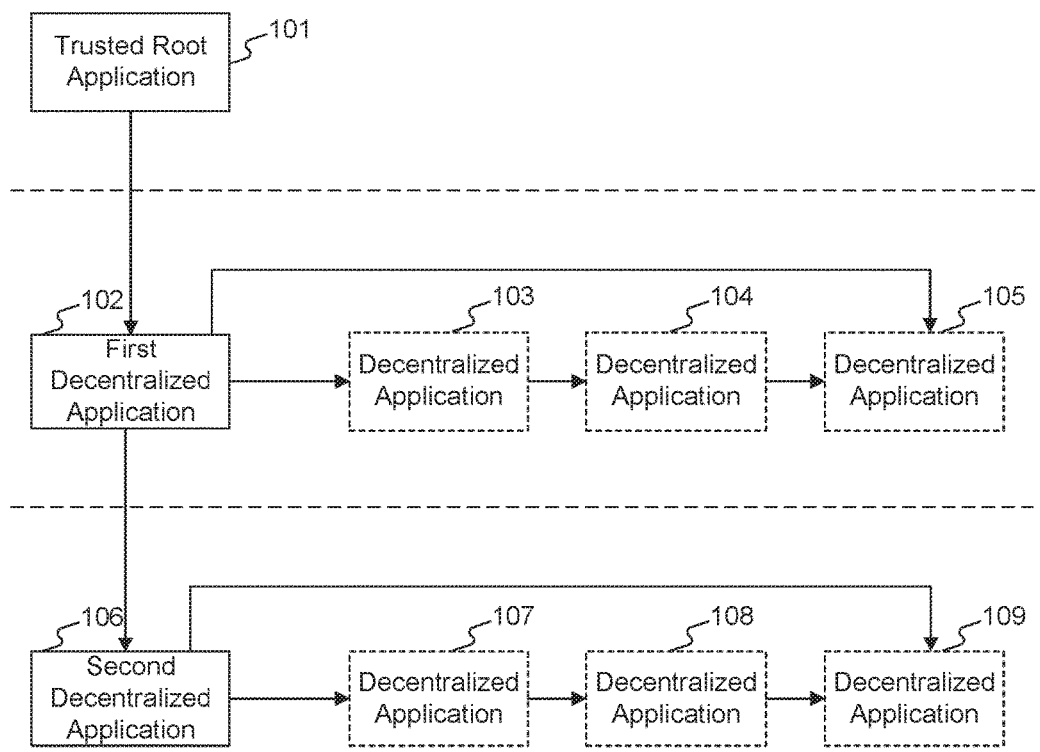
FIG. 1 is a block diagram of an example system for decentralized and scalable trust among a plurality of decentralized applications in accordance with disclosed embodiments.

FIG. 1 is a block diagram of an example system 100 for decentralized and scalable trust among a plurality of decentralized applications 101-109 consistent with disclosed embodiments. As shown, system 100 includes a plurality of applications 101-109, which may be deployed in one or more network environments, such as on-premises networks, cloud-based networks, or combinations of both. The networks may be based on any type of computer networking arrangement used to exchange data, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile network, a private data network, a virtual private network using a public network, a nearfield communications technique (e.g., Bluetooth, infrared, etc.) that enables applications 101-109 to send and receive information with each other or other components in system 100. In some embodiments, the networks may include two or more of these forms of communications.

Trusted root application 101 may be a secure application maintained for the purpose of establishing chains of cryptographic trust with other applications (e.g., applications 102-109). Such chains of cryptographic trust may include some, or all, applications in a particular network environment. In this role, trusted root application 101 may have complete permissions or privileges, or nearly all permissions or privileges, in its network environment. For example, in a virtualized network environment where applications 102-109 are each virtual machines, container instances, or serverless code instances, trusted root application 101 may have complete (or nearly complete) privileges over the creation, modification, and deletion of applications 102-109. Such privileges and permissions may include, for example, spinning up applications, defining the privileges of applications, executing code by applications, providing data to applications, copying data from applications, modifying data associated with applications, establishing communications connections between applications, monitoring communications of applications, blocking communications of applications, and more. In a Linux or Unix environment, for example, the trusted root application 101 may be a superuser identity. Alternatively, in some embodiments, a trusted root application 101 may not have complete and total privileges and permissions, but may have a substantial subset of privileges and permissions. As discussed further below, trusted root application 101 may be configured to delegate or share a subset of its privileges and permissions to other applications, e.g., applications 102-109.

In some embodiments, trusted root application 101 is included in a network where the techniques of decentralized authentication described herein are practiced. For example, in a network of microservices that perform functions as part of an artificial intelligence application (e.g., machine vision, high-speed financial transactions, autonomous driving, etc.), trusted root application 101 may be part of the artificial intelligence application network. For example, trusted root application 101 may be embedded into a client device, a microservice, or a server that is part of the microservices network devoted to performing the artificial intelligence functions. In other embodiments, trusted root application 101 may be external to the network environment where decentralized applications 102-109 are performing their tasks. For example, trusted root application 101 may be maintained by a third-party service provider (e.g., cybersecurity service provider) external to the decentralized application network (e.g., external to system 100). In such a deployment, trusted root application 101 may be accessible to decentralized applications 102-109 for the purposes of forming a cryptographic chain of trust, but may be physically and/or logically separate from decentralized applications 102-109. Further, in some embodiments, trusted root application 101 may be configured to form multiple, independent chains of cryptographic trust. For example, if trusted root application 101 is maintained by a third-party service provider (e.g., cybersecurity service provider), it may serve as the trusted origin point for cryptographic chains of trust at multiple networks for which it is providing services.

The decentralized applications 102-109 may be a variety of different types of applications or computing devices with network communications capabilities. For example, applications 102-109 may be identities (e.g., accounts, users, etc.) established according to a particular operating system (e.g., Microsoft Windows™ accounts, Apple iOS™ accounts, Unix/Linux accounts, etc.) or particular applications (e.g., an Internet browser, business application, engineering application, social networking application, etc.). Applications 102-109 may also be locally hosted (e.g., on-premises) applications, or virtualized instances of applications, such as virtual machines, container instances, serverless code instances, etc. Further, applications 102-109 may be associated with personal computers, laptops, mobile computing devices (e.g., smartphones), tablets, IoT devices, wearable computer devices (e.g., smart clothing, smart watches, smart jewelry, etc.), automotive computer devices, smart home appliances, etc. As discussed further below, such applications 102-109 may include hardware processors and memories for storing data and/or software instructions, as well as communications interfaces for exchanging data with each other and other network resources. Further, in some embodiments, applications 102-109 may be microservices configured to perform individualized, discrete tasks. In such an environment, applications 102-109 may communicate with each other in furtherance of an overall function or process (e.g., a web hosting process, an e-commerce process, a business intelligence service, a database update or access process, etc.).

In some embodiments, decentralized applications 102-109 are part of the same network environment as trusted root application 101 and each other. For example, consistent with the above example of a microservices network configured to perform an artificial intelligence function, the trusted root application and decentralized applications 102-109 may all be part of the same artificial intelligence network (e.g., all part of system 100). Nevertheless, in other embodiments, decentralized applications may be part of a build system or other type of dynamic network environment (e.g., continuous delivery, continuous development, DevOps, Jenkins-based system, etc.). In such an environment, as discussed further below, decentralized applications 102-109 may be dynamically spun up or down continuously, as part of an overall development or deployment process, a load balancing process, etc. Further, in some embodiments, decentralized applications 102-109 may be in separate networks from each other. For example, as discussed above, in some embodiments a trusted root application 101 may serve to provide multiple different chains of cryptographic trust in different networks. As an illustration, some of decentralized applications 102-109 may be in a network of a first enterprise, while other of decentralized applications 102-109 may be in a network of a second enterprise, where the same trusted root application 101 serves both networks.

As further discussed below, trusted root application 101 may be a beginning point for a chain of trust, that continues through a first decentralized application 102, a second decentralized application 106, and potentially many more decentralized applications. While trusted root application 101 may have complete (or nearly complete) network privileges and permissions, it may share or delegate a subset of those rights to first decentralized application 102. In turn, first decentralized application 102 may delegate or share a subset of those rights with second decentralized application 106. In addition, first decentralized application 102 may spawn multiple other decentralized applications 103, 104, and 105 having the same privileges as it. For example, this may occur in a scaling process, where additional identical instances of first decentralized application 102 are needed in the network (e.g., in order to accommodate an increase in demand for a service provided by first decentralized application 102). Further, in other embodiments, first decentralized application 102 may share identical versions of its privileges with decentralized applications 103-105, even though first decentralized application 102 and decentralized applications 103-105 have different functionality from each other. Either way, a chain of trust may be formed between applications 102-105 continuing upward to trusted root application 101.

As illustrated in FIG. 1, while first decentralized application 102 may share an identical version of its permissions with decentralized applications 103-105, it may also share a subset of its permissions with second decentralized application 106. Similarly, second decentralized application 106 may in turn share an identical version of its privileges with decentralized applications 107-109, or may share a subset of its privileges with a third decentralized application (not shown). This process may continue, resulting in many links in the chain of applications between trusted root application 101 and its children applications.

As an illustration of the chaining process of FIG. 1, system 100 may be configured in a web hosting environment. For example, system 100 may be configured to host a particular website accessible to clients. In this situation, trusted root application 101 may be configured as an application having complete (or nearly complete) permissions with respect to the functionality of all applications in the web hosting environment. As such, trusted root application may have privileges over spinning up new applications (e.g., to host discrete web pages, or to support discrete functionality within a web page), modifying applications, executing applications, controlling permissions of applications, deleting applications, etc. A first decentralized application 102 may be configured to host a particular web page within the website. As demand for the particular web page grows (e.g., as determined by a load balancing resource), multiple additional instances of the first decentralized application 102 may be instantiated (e.g., as applications 103-105). In this example system 100, the particular web page may be configured to call a backend application (e.g., associated with a widget or plugin in the web page) which is instantiated as second decentralized application 106. The second decentralized application 106 may have a subset of the privileges of the first decentralized application 102 (e.g., only reading or copying privileges). As demand or use for the widget or plugin increases, multiple other instances of the second decentralized application 106 may be instantiated as applications 107-109. In this way, the system 100 may flexibly address increases and decreases in demand for the functionality performed by applications 102-109. Of course, while website hosting is one example of such functionality, the same techniques of chaining and decentralized privilege delegation may be applied to numerous other functionalities performed in network environments.

Figure 2:
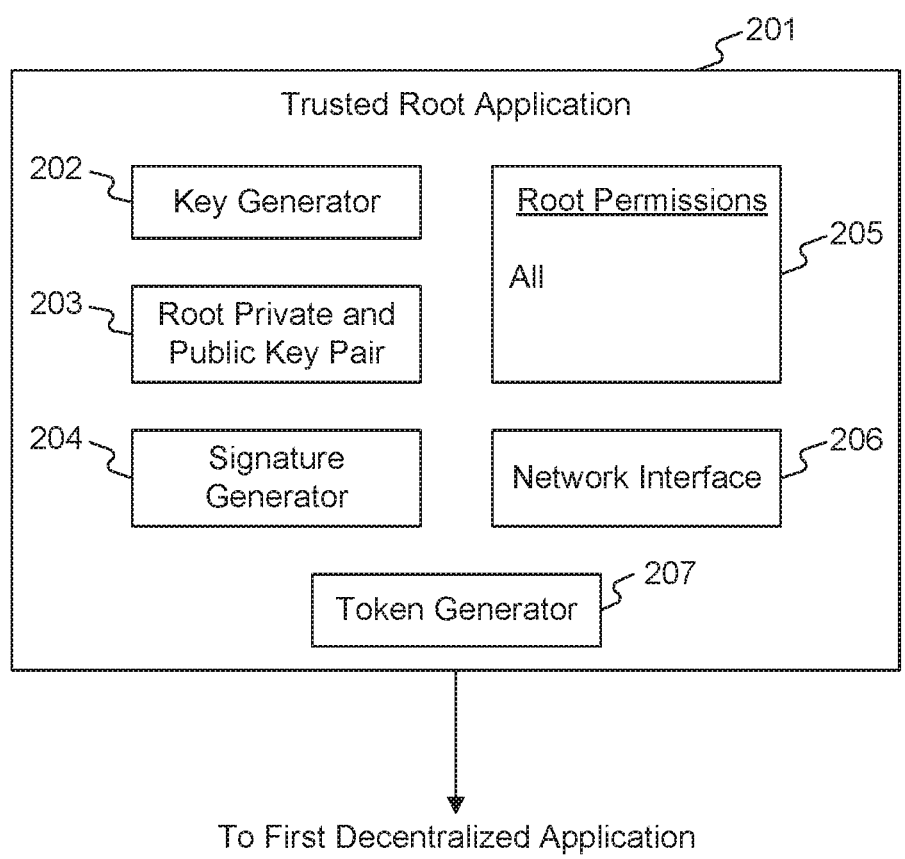
FIG. 2 is an exemplary illustration of a trusted root application and its components, in accordance with disclosed embodiments.

FIG. 2 is an exemplary illustration 200 of a trusted root application 201 and its components consistent with disclosed embodiments. As discussed above in connection with FIG. 1, trusted root application 201 may correspond to trusted root application 101. In order to facilitate the techniques of decentralized authentication described above, trusted root application 201 may include various components, as illustrated in FIG. 2. For example, trusted root application 201 may include a key generator 202, root private and public key pair storage 203, signature generator 204, root permissions index 205, network interface 206, and token generator 207.

Key generator 202 may be an application or code portion configured to generate one or more symmetric or asymmetric cryptographic keys. In various embodiments, key generator 202 may be internal to trusted root application 201 or may be externally hosted (e.g., hosted at a cloud orchestration resource such as IMB Cloud Orchestrator™, Apache CloudStack™, OpenStack™, Microsoft Azure™, Amazon AWS™, or a network administrator resource, etc.). In order to generate symmetric keys, for example, key generator 202 may store, or have access to, algorithms such as Data Encryption Standard (DES), Triple DES (TDES), Advanced Encryption Standard (AES), CAST-128, or various others. To generate asymmetric keys, key generator may store, or have access to, algorithms such as Diffie-Hellman (DH), Digital Signature Standard (DSS), Rivest-Shamir-Adleman (RSA), or various others. In accordance with embodiments discussed below, key generator may be configured to generate keys when needed. For example, if trusted root application 201 determines that it trusts a decentralized application, it may generate a private and public key pair, which may be stored in storage 203.

Trusted root application 201 may also include a signature generator 204. The signature generator 204 may be configured to provide digital signatures in accordance with the asymmetric encryption technique being used by the trusted root application (e.g., DH, DSS, RSA, etc.). According to various embodiments, as discussed below, signature generator 204 may be configured to sign a public key, or sign a trust token including a public key, with a digital signature. Examples of such signatures are discussed further below in connection with FIGS. 8 and 9.

Trusted root application 201 may further include a root permissions index 205, defining the rights, permissions, and other privileges of trusted root application 201. As discussed above, trusted root application 201 may have complete and total privileges (e.g., as a superuser) over other applications in its network. Nevertheless, in other embodiments, trusted root application 201 may have less than all privileges, but enough privileges to share or delegate needed privileges to children applications in its chain (e.g., a first decentralized application, second decentralized application, etc.). For example, if child applications only need a subset of privileges (e.g., read, copy, execute), trusted root application need not have complete and total privileges in order to delegate or share such privileges with the child applications.

Trusted root application 201 may further have a network interface 206, which allows for network communications between trusted root application 201, child applications, and other network resources (e.g., a cloud orchestration resource, a network administrator resource, an auditing and reporting resource, a security resource, etc.). Network interface 206 may include communications interface components of a computing device on which trusted root application operates (e.g., Ethernet connection, WiFi transceiver, Bluetooth transceiver, RFID transceiver, infrared transceiver, cellular transceiver, mesh network transceiver, etc. Further, network interface 206 may include software-based communications interfaces, such as software for application layer protocols (e.g., HTTP/S, RTP, SSH, etc.) or transport layer protocols (e.g., TCP/IP UDP, etc.).

In addition, trusted root application 201 may include a token generator 207, which may be configured to generate trust tokens. For example, token generator 207 may be configured to generate tokens according to various different protocols, including JSON Web Tokens (JWT), Security Assertion Markup Language (SAML) tokens, Kerberos tokens, Simple Web Tokens (SWT), and more. Token generator 207 may be configured to identify permissions (e.g., from root permissions index 205) in tokens, to thereby define what permissions a recipient of the token (e.g., a child application) has. For example, if the trusted root application has total privileges in a network, token generator 207 may include a subset of those privileges (e.g., write, read, copy, execute) in a trust token. In some embodiments, as further discussed below, a token generated by token generator 207 may further include a public key (e.g., from storage 203). Further, the token may be signed by the trusted root application 201 (e.g., by signature generator 204). As further discussed below, a trust token generated by token generator 207 may be included in an authentication token, which may be used to request authentication.

Figure 3:
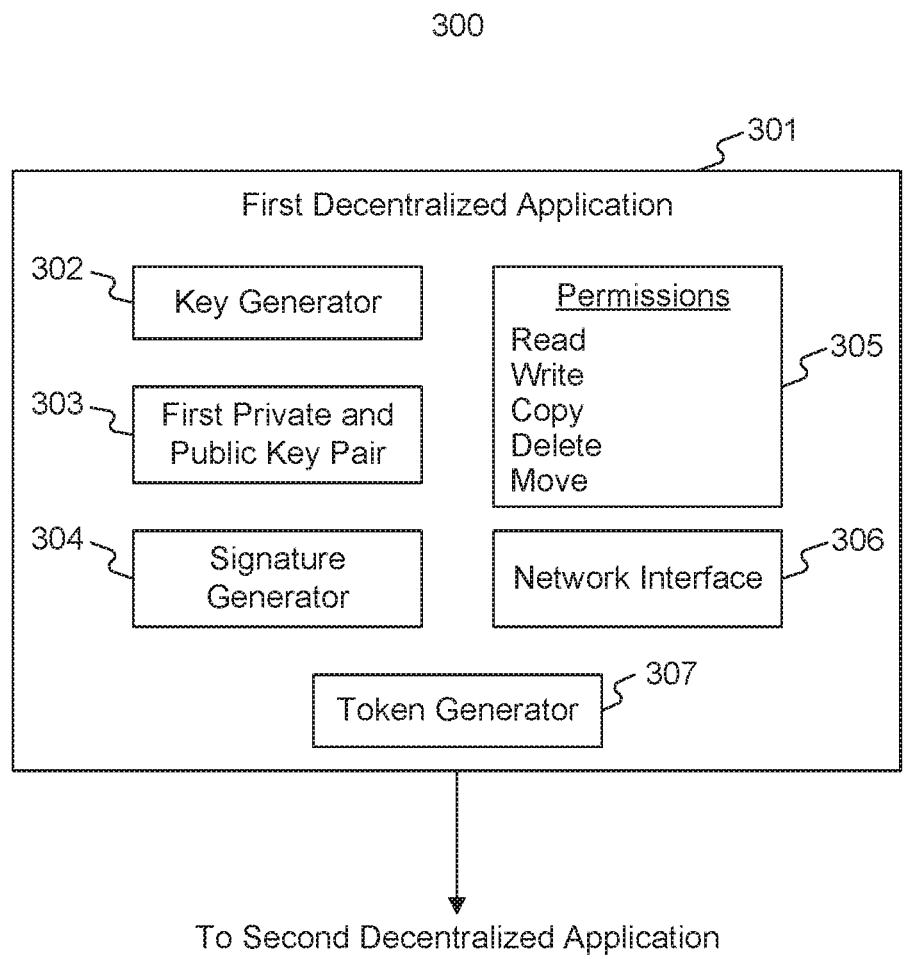
FIG. 3 is an exemplary illustration of a first decentralized application and its components, in accordance with disclosed embodiments.

FIG. 3 is an exemplary illustration 300 of a first decentralized application 301 and its components consistent with disclosed embodiments. Similar to the discussion above regarding FIG. 2, the first decentralized application 301 may include a key generator 302, private/public key pair 303, signature generator 304, permissions index 305, network interface 306, and token generator 307.

For example, key generator 302 may be similar to key generator 202, but configured to generate symmetric and/or asymmetric cryptographic keys for use by the first decentralized application 301. Cryptographic keys generated, or accessed, by the first decentralized application 301 may be stored in key storage 303. Signature generator 304 may be similar to signature generator 204, but configured to provide digital signatures in accordance with the asymmetric encryption technique being used by the first decentralized application 301 (e.g., DH, DSS, RSA, etc.). According to embodiments discussed below, signature generator 304 may be configured to sign a public key, or sign a trust token including a public key, with a digital signature. Examples of such signatures are discussed further below in connection with FIGS. 8 and 9. First decentralized application 301 may also have a permissions list 305 that, while similar to the permissions index 205 of trusted root application 201, includes fewer privileges. As illustrated, permissions list 305 includes permissions of read, write, copy, delete, and move, which represent a subset of the permissions (i.e., all permissions) possessed by trusted root application 201. First decentralized application 301 may also include a network interface 306, which may be similar to network interface 206. Further, first decentralized application 301 may include a token generator 307, which may be similar to token generator 207, except configured to generate trust tokens by or on behalf of first decentralized application 301. For example, token generator 307 may be configured to generate tokens according to protocols such as JWT, SAML, Kerberos tokens, SWT, and more. Token generator 307 may also be configured to identify permissions (e.g., from permissions index 305) to specify in tokens, and thereby define what permissions a recipient of the token (e.g., a child application) has. In some embodiments, a token generated by token generator 307 may further include a public key (e.g., from storage 303), and the token may be signed by the first decentralized application 301 (e.g., by signature generator 304). As further discussed below, a trust token generated by token generator 307 may be included in an authentication token, which may be used to request authentication. Just as trusted root application 201 may be configured to communicate with one or more child applications, similarly first decentralized application 301 may be configured to communicate with one or more child applications.

Figure 4:
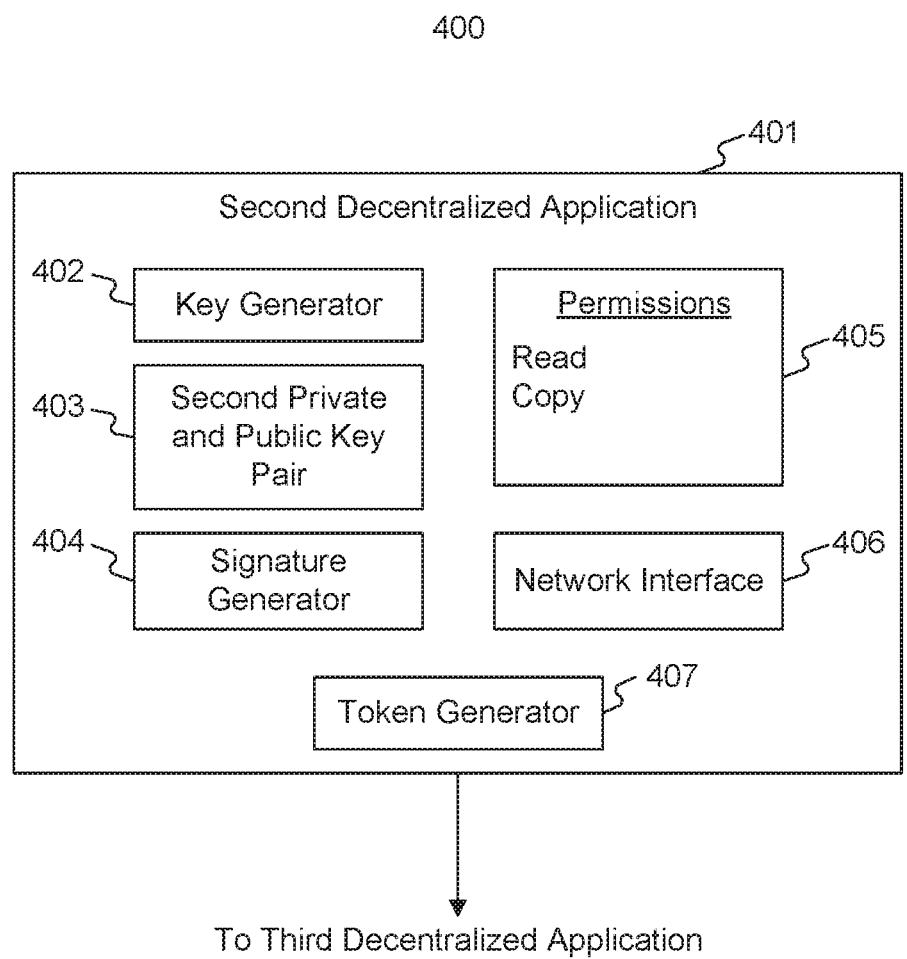
FIG. 4 is an exemplary illustration of a second decentralized application and its components, in accordance with disclosed embodiments.

FIG. 4 is an exemplary illustration 400 of a second decentralized application 401 and its components consistent with disclosed embodiments. Similar to the discussion above regarding FIGS. 2 and 3, the second decentralized application 401 may include a key generator 402, private/public key pair 403, signature generator 404, permissions index 405, network interface 406, and token generator 407.

Consistent with the above discussion, key generator 402 may be similar to key generators 202 and 302, but configured to generate symmetric and/or asymmetric cryptographic keys for use by the second decentralized application 401. Cryptographic keys generated, or accessed, by the second decentralized application 401 may be stored in key storage 403. Signature generator 404 may be similar to signature generator 404, but configured to provide digital signatures in accordance with the asymmetric encryption technique being used by the second decentralized application 401 (e.g., DH, DSS, RSA, etc.). According to embodiments discussed below, signature generator 404 may be configured to sign a public key, or sign a trust token including a public key, with a digital signature. Examples of such signatures are discussed further below in connection with FIGS. 8 and 9. Second decentralized application 401 may also have a permissions list 405 that, while similar to the permissions indexes 205 and 305 discussed above, includes fewer privileges. As illustrated, permissions list 405 includes permissions of read and copy, which represent a subset of the permissions possessed by trusted root application 201 and first decentralized application 301. Second decentralized application 401 may also include a network interface 406, which may be similar to network interface 306, and a token generator 407, which may be similar to token generator 307 except configured to generate trust tokens by or on behalf of second decentralized application 401. Token generator 407 may be configured to generate tokens according to protocols such as JWT, SAML, Kerberos tokens, SWT, and more. Token generator 407 may also be configured to identify permissions (e.g., from permissions index 405) to specify in tokens, and thereby define what permissions a recipient of the token (e.g., a child application) has. A token generated by token generator 407 may further include a public key (e.g., from storage 403), and the token may be signed by the second decentralized application 401 (e.g., by signature generator 404). As further discussed below, a trust token generated by token generator 407 may be included in an authentication token, which may be used to request authentication. Second decentralized application 401 may be configured to communicate with one or more child applications.

Figure 5:
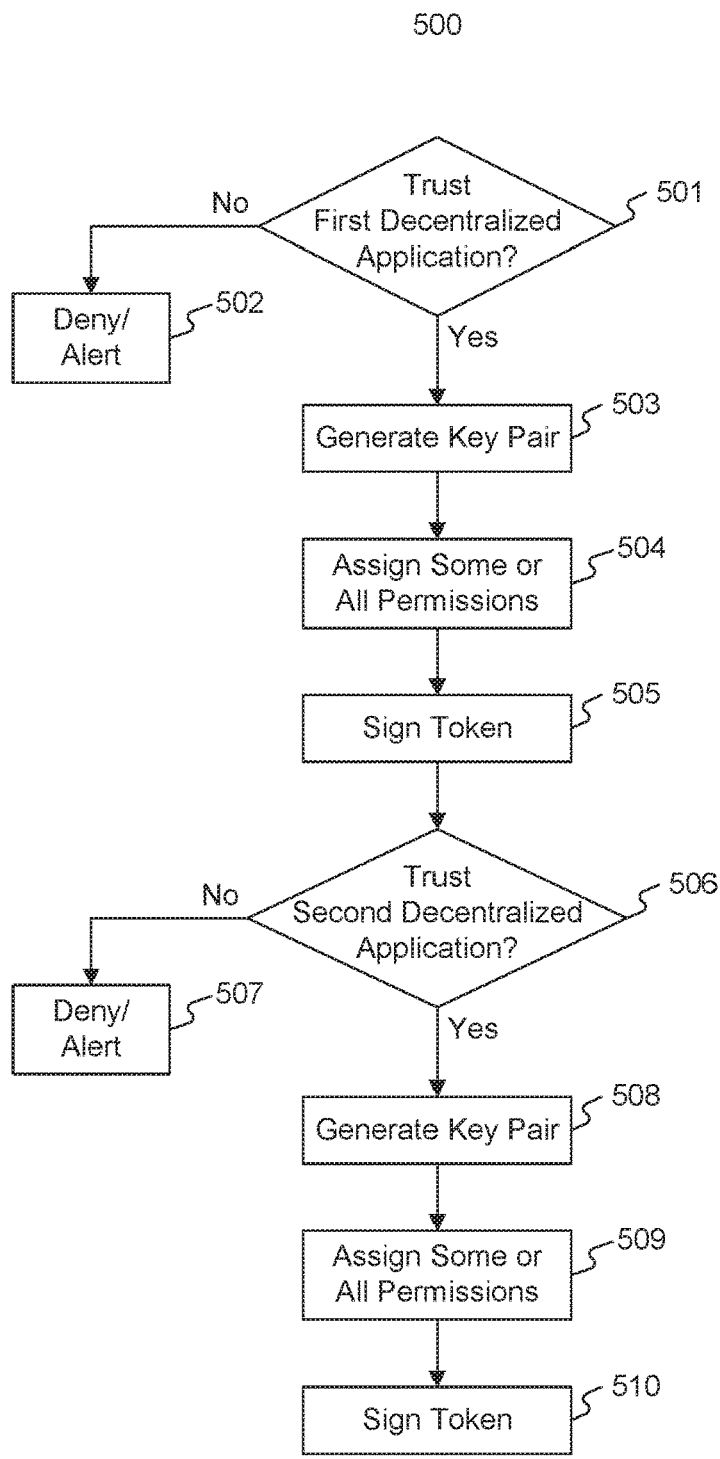
FIG. 5 is a flowchart depicting an exemplary process for creating authentication information as part of a chaining process among applications, in accordance with disclosed embodiments.

FIG. 5 is a flowchart depicting an exemplary process 500 for creating authentication information as part of a chaining process among applications consistent with disclosed embodiments. Consistent with the above discussion, process 500 may be performed in the environment of system 100. For example, operations 501-505 may be performed by trusted root application 101, while operations 506-510 may be performed by first decentralized application 102. In general, according to process 500, a trusted root application may begin a cryptographic chain of trust, using one or more trust tokens, which enable children applications (e.g., first decentralized application, second decentralized application, etc.) to establish trust from upward in the chain, potentially all the way back to the trusted root application itself. At each link in the chain, the parent application may share or assign some or all of its privileges with a child application.

In an operation 501, process 500 may determine whether to trust a first decentralized application. This determination may be made in various different ways. For example, if the trusted root application is responsible for creating (or requesting the creation of) the first decentralized application, that may be a basis for the trusted root application to trust the first decentralized application. This may occur, for instance, if the trusted root application is involved in a process of spinning up new applications, such as in a virtualized environment with a cloud orchestration resource. In further embodiments, the trusted root application may determine that it trusts the first decentralized application if the first decentralized application is verified in some manner. For example, the first decentralized application may be verified in terms of a unique attribute (e.g., a signature, a token, a hash value, a unique identifier number, a timestamp, etc.). The trusted root application may verify the first decentralized application in such embodiments by verifying the unique attribute, or receiving a report from another resource regarding the verifying of the unique attribute. In further embodiments, the trusted root application may be instructed to trust, or to not trust, all child decentralized applications for a specified period of time.

Based on the outcome of operation 501, it may be determined whether the first decentralized application is trusted. If it is not trusted, process 500 may end in an operation 502 of denying extending the chain of cryptographic trust to the first decentralized application and/or generating an alert. The alert, for example, may identify the first decentralized application and any information regarding it used in the attempted trust process (e.g., signature, token, hash value, unique identifier number, timestamp, etc.). If the first decentralized application is not trusted, process 500 may end without trusted root application generating a public/private key pair for use with the first decentralized application.

If the result of operation 501 is that the first decentralized application is trusted, process 500 may continue with operation 503, which may involve generating a cryptographic key pair (e.g., public and private key pair). For example, in accordance with FIG. 2, trusted root application 201 may utilize a key generator 202 to generate, or access, a public/private key pair based on a particular encryption protocol. The public/private key pair may be stored in key memory 203. For example, the public/private key pair may be stored as being associated with a particular first decentralized application (e.g., the one that was determined to be trusted in operation 501). In some embodiments, key memory 203 further stores an identifier linking the public/private key pair to the particular first decentralized application. Of course, in embodiments where the trusted root application provides trust to multiple different child applications, the trusted root application may generate multiple different public/private key pairs for those different child applications, each of which may be stored in key memory 203 and linked to its corresponding child application.

In an operation 504, the trusted root application may assign or delegate some or all of its permissions, rights, and other privileges to the first decentralized application. The determination of which privileges to assign or delegate may be made in several different ways. For example, if the trusted root application is instructed to duplicate itself, it may determine to provide all of its privileges to the first decentralized application. Alternatively, if the trusted root application is instructed on what specific privileges the first decentralized application needs, it may provide only those privileges. For example, while the trusted root application may have complete (or nearly complete) privileges in the network, if the first decentralized application only needs read, write, copy, and modify privileges, the trusted root application may assign only those privileges to the first decentralized application. In some embodiments, the specific privileges that a first decentralized application needs may be specified by a cloud orchestration resource or workflow management resource configured to oversee the generation and use of child applications in the network. As discussed further below, privileges determined to be shared or delegated in operation 504 may be included in a trust token, which is then provided to the first decentralized application.

Process 500 further includes an operation 505 of signing the trust token. For example, the trusted root application may sign a token that includes a public key and the permissions identified in operation 504. As discussed above, the token may be created according to various different protocols, such as JWT, SAML, Kerberos tokens, SWT, and more. This trust token may then be provided to the first decentralized application to extend the chain of cryptographic trust to the first decentralized application.

Process 500 may then continue with operations 506-510, which are similar to operations 501-505 except that they are performed by the first decentralized application. For example, in operation 506, similar to operation 501, the first decentralized application may determine whether it trusts a second decentralized application. This may occur using the techniques described above in connection with operation 501, or may further be based on trust information provided from the trusted root application to the first decentralized application. If the second decentralized application is not determined to be trusted in operation 506, process 500 may deny extending the cryptographic chain of trust to the second decentralized application or generate an alert in operation 507. Alternatively, if the second decentralized application is trusted, process 500 may continue to operation 508, where a public/private key pair is generated to extend the chain of cryptographic trust to the second decentralized application. Some or all of the permissions held by the first decentralized application may be shared or delegated to the second decentralized application in operation 509, and a trust token containing the generated public key and the permissions may be signed in operation 510.

Of course, process 500 may then continue beyond operation 510. For example, the trust token generated in operation 510 may be provided to a third decentralized application. The third decentralized application may then itself continue the cryptographic chain of trust to additional child applications using the same techniques described in operations 501-510.

Figure 6:
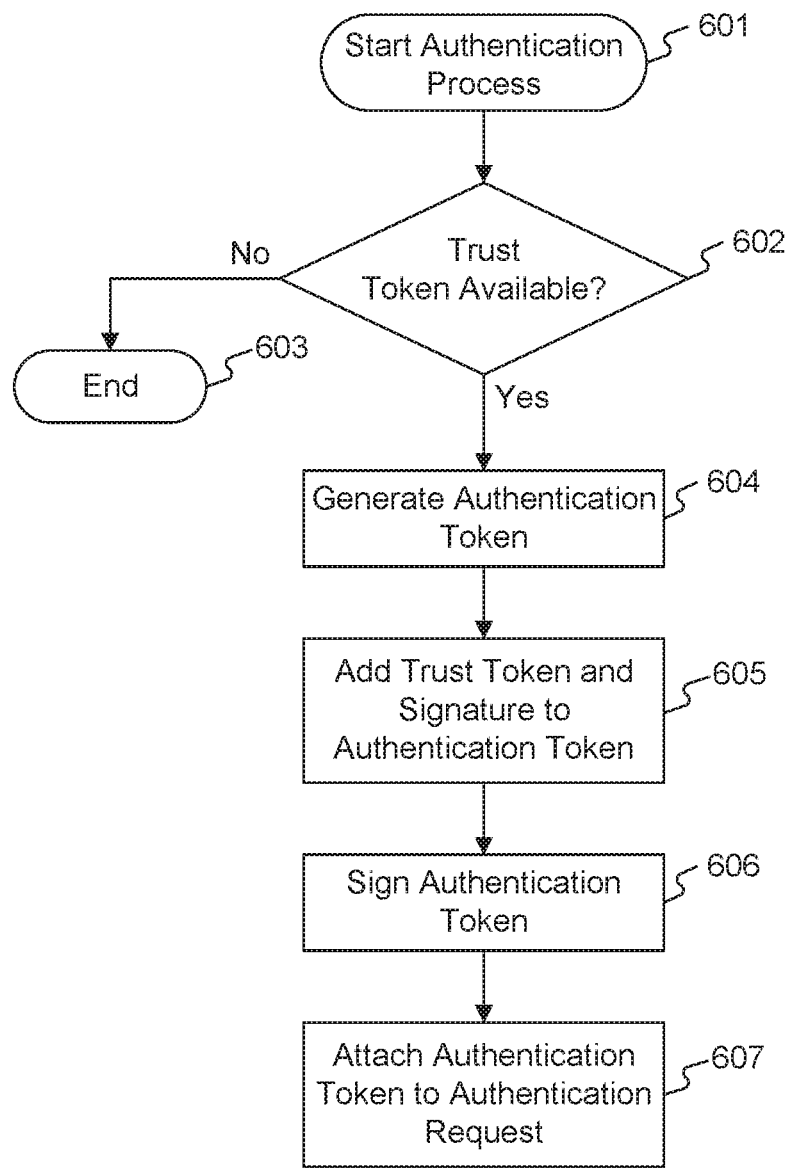
FIG. 6 is a flowchart depicting an exemplary process for making a client authentication request as part of a process of decentralized and scalable trust among a plurality of decentralized applications, in accordance with disclosed embodiments.

FIG. 6 illustrates an exemplary flowchart for a process 600 of authenticating an application in a chain of cryptographic trust. According to process 600, once a decentralized application has received a trust token (e.g., including a public key and index of permissions), it may use the trust token to authenticate itself to a parent application. In various embodiments, process 600 may be performed by a client application seeking access to a network resource. The client application may be the same as the decentralized application itself, or both may be associated (e.g., running on the same computing device).

In an operation 601, process 600 may begin an authentication process. For example, the authentication process may begin when a decentralized application seeks to communicate with another application requiring authentication. For example, various resources in a network may require authentication prior to access, such as secure servers, databases, virtualized containers, serverless code instances, etc. Before accessing such resources, a decentralized application may have to authenticate itself. Alternatively, the secure resource itself may redirect the decentralized application to begin an authentication process. In some embodiments (e.g., in secure network environments), decentralized applications may be configured by default to request authentication for all of their communication requests. In further embodiments, authentication challenges may be made to decentralized application regardless of any request by the decentralized application for access to a secure resource. For example, a network security policy may dictate that decentralized applications are periodically (e.g., hourly, weekly, etc.) challenged to authenticate themselves. Similarly, decentralized applications may be challenged to authenticate themselves upon them being initially spun up or initialized in the network environment.

As part of the authentication process, a decentralized application may determine whether it has a trust token available in an operation 602. For example, as discussed above, a trusted root application may provide a trust token to a first decentralized application, the first decentralized application may provide another trust token to a second decentralized application, and so on. If the decentralized application determines in operation 602 that no trust token is available (e.g., because one was never received, or a received trust token has expired), process 600 may end in operation 603, where the authentication process is determined to have failed. In that case, the decentralized application may be denied access to the secure network resource it is attempting to access.

If a trust token is available to the decentralized application (e.g., a current, valid trust token is stored in a memory of the device running the decentralized application), process 600 may continue to operation 604 of generating an authentication token for the decentralized application. The authentication token can be generated by the decentralized application according to several different protocols, such as JWT, SAML, Kerberos tokens, SWT, and more. In some embodiments, the trust token may be embedded or written into fields of the authentication token. In other embodiments, the authentication token may include a pointer, URL, or other link to a storage location where the trust token may be found and retrieved. Further, in some embodiments the trust token may be represented in metadata of the authentication token.

Process 600 may then continue with operation 605, where the trust token is added to the authentication token together with a digital signature. As discussed above, the trust token may be incorporated into, represented in, or referenced in the authentication token in several different ways. The authentication token may further include a digital signature of the trust token (e.g., computed by the parent application that created the trust token, or computed by the decentralized application itself), or a digital signature of the authentication token (e.g., computed by the decentralized application).

In an operation 606, the decentralized application may sign the authentication token. For example, the decentralized application may use its private cryptographic key to digitally sign the authentication token. As discussed above, a variety of different algorithms may be used to generate the private key (and its corresponding public key), as well as the digital signature, such as DH, DSS, RSA, etc. The signature of the authentication token may be included in a field of the authentication token, in metadata of the authentication token, or potentially in a separate file that is associated with the authentication token.

In an operation 607, process 600 may further include attaching the signed authentication token to an authentication request. For example, the authentication request may be sent to the secure network resource to which the decentralized application is seeking to connect. Alternatively, as discussed above, the authentication request may be sent to a network security service configured to challenge the authentication of decentralized applications. The request may be, for example, an HTTP/s request, SSH request, FTP request, etc. Once the authentication token is received, the authentication of the decentralized application may be determined, as further discussed below. For example, the trust token may be extracted from the authentication token, the authentication token's signature may be validated using the public key provided in the trust token. These techniques are further described in connection with FIG. 7.

Figure 7:
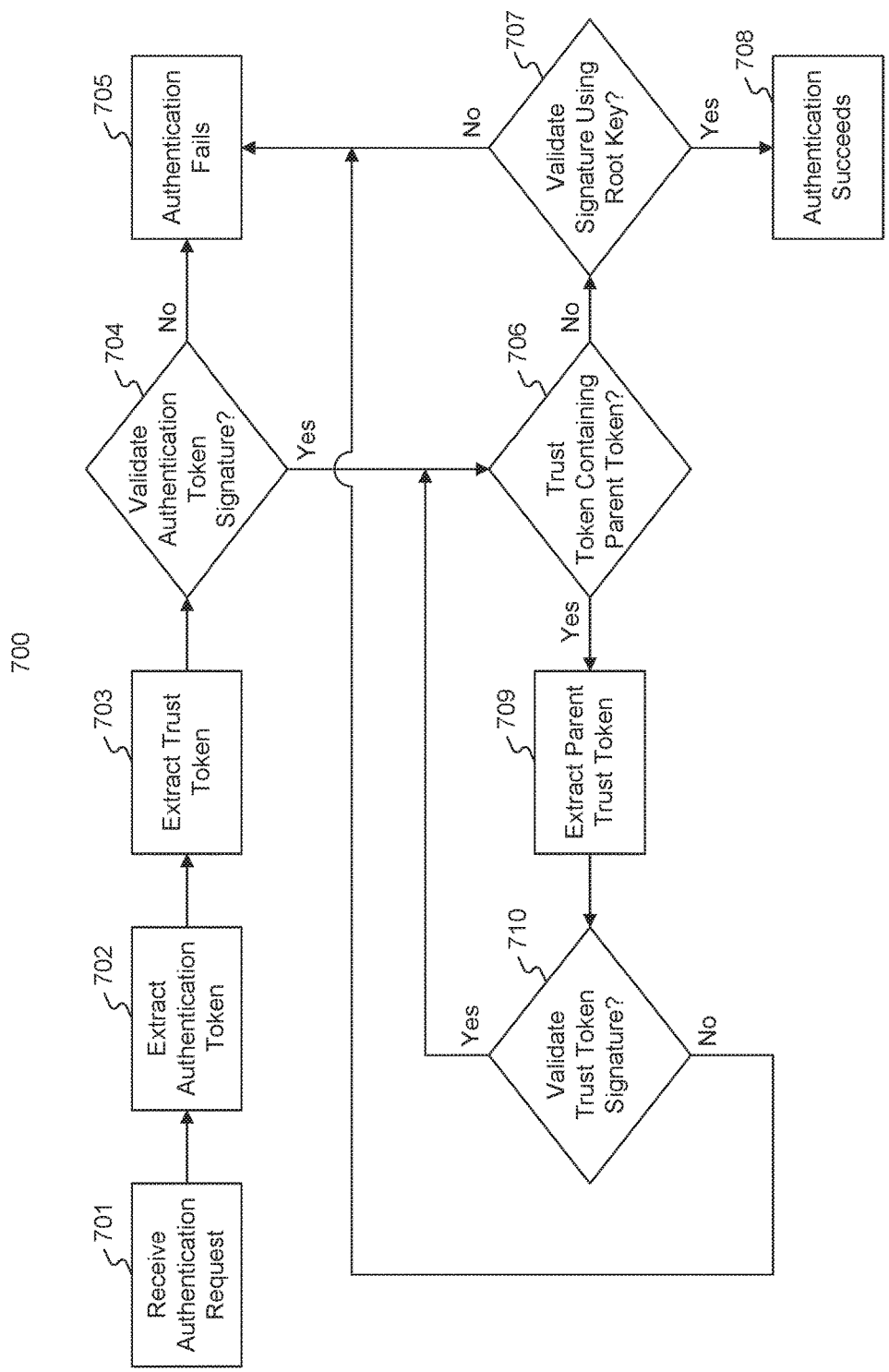
FIG. 7 is a flowchart depicting an authentication process as part of a process of decentralized and scalable trust among a plurality of decentralized applications, in accordance with disclosed embodiments.

FIG. 7 is an illustration of an exemplary process 700 for authenticating clients in a decentralized, cryptographic chain of trust, consistent with embodiments of this disclosure. Process 700 may be performed in the network system environment of FIG. 1. For example, second decentralized application 106 or its counterparts 107-109 may make an authentication request, which is received by first decentralized application 102 or its counterparts 102-105. Further, first decentralized application 102 or its counterparts 102-105 may make an authentication request to trusted root application 101. Of course, additional layers of decentralized applications may make authentication requests up the chain of applications as well.

In an operation 701, a request for authentication may be received. As discussed above, the request (e.g., an HTTP/s request, SSH request, FTP request, etc.) may come from a client application, which may be a decentralized application or another application associated with a decentralized application (e.g., running on the same device). The request may include, or include a reference to, an authentication token. Consistent with above embodiments, the authentication token may include a trust token created as part of the process of extending the chain of cryptographic trust to the decentralized application.

Process 700 may continue with an operation 702 of extracting the authentication token from the request received in operation 701. For example, the authentication token may be included in a header field, or a payload, of the request. Further, in operation 703, the trust token may be extracted from the authentication token. Consistent with above embodiments, the trust token may be embedded within the authentication token, referenced by the authentication token, or stored in metadata of the authentication token.

In an operation 704, the signature of the authentication token may be validated. For example, when the client application received a trust token from its parent application, the trust token may have included a public key. Using the public key, the signature of the authentication token may be validated. If the signature of the authentication token is not able to be validated in operation 704, the authentication process may result in a lack of authentication in operation 705.

On the other hand, if the validation of the authentication token's signature is successful in operation 704, process 700 may continue to operation 706 of validating the trust token chain. Consistent with the above discussion, this may involve extracting the parent trust token in operation 709 from the trust token of the authentication token. The signature of the parent trust token may be validated in operation 710 using the public key present in the parent trust token. The steps 706, 709, and 710 may be repeated as many times as further parent trust tokens are extracted. One there are no more parent trust tokens to be extracted in operation 709, the result of operation 706 is to validate the signature of the last extracted trust token and validate the signature in operation 708 using the root public key. If the signature is successfully validated using the root public key, the authentication succeeds in operation 708. Alternatively, authentication fails in operation 705. In some embodiments, the target application being accessed by the client application has its own trust token. In that situation, the target application can end the validation process (e.g., steps 706, 709, 710) if it detects its parent's trust token in the request from the client, and that parent's trust token is validated.

Following a successful authentication in operation 708, the permissions of the requesting client application may be extracted and enforced. For example, if the requesting client is determined to only have read and copy privileges, those privileges may be allowed while other privileges may be disabled (e.g., write, delete, modify, execute, etc.). In some embodiments, the privileges of the requesting client application may be enforced by the target application. In other embodiments, those privileges are enforced by the client application itself, an intermediary (e.g., proxy) application, or an external security application having control over the client application.

Figure 8:
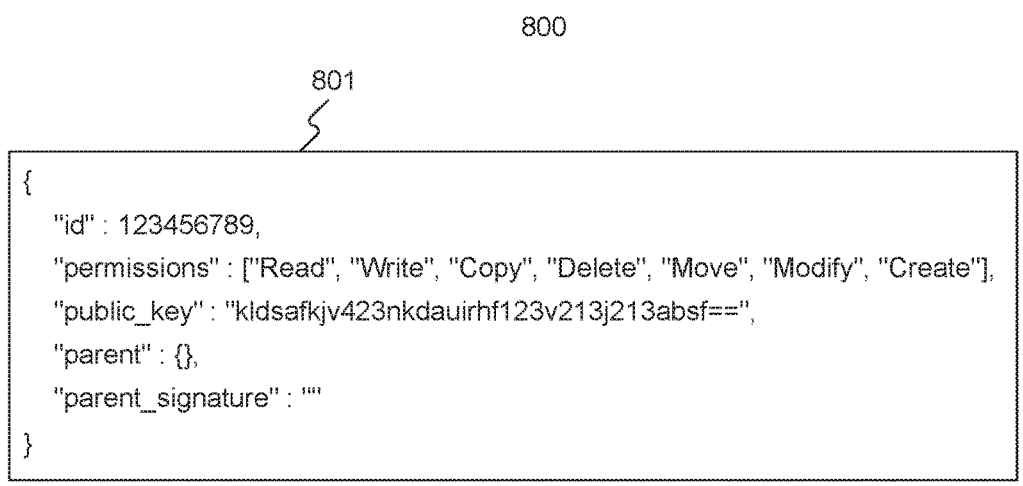
FIG. 8 is an exemplary depiction of a first trust token with certain permissions, in accordance with disclosed embodiments.

FIGS. 8 and 9 are illustrations of exemplary trust tokens, 801 and 901. As illustrated, trust token 801 may be a child trust token, or a trust token associated with a first decentralized application. As illustrated, the trust token 801 may include fields such as a unique identifier "id" field, a "permissions" definition (here, read and write), a particular "public key" value, information regarding a parent application (here, none), and information regarding a parent digital signature (here, none). Similarly, trust token 901 may include similar fields, but may be associated with a second decentralized application that is lower in the chain of cryptographic trust than the first trust token 801. As shown, trust token 901 may include a particular unique identifier "id" field, a "permissions" definition (here, read, which is a subset of the privileges of trust token 801), a particular "public key" value, and information regarding the parent application (e.g., the parent's "id" from trust token 801, the parent's privileges, the parent's public key, and the parent's own parent information). Further, trust token 901 may include a parent signature, which is provided by the application associated with trust token 801. As discussed above, trust tokens may include (or be associated with) a digital signature that is signed using their parent's private key.

Figure 10:
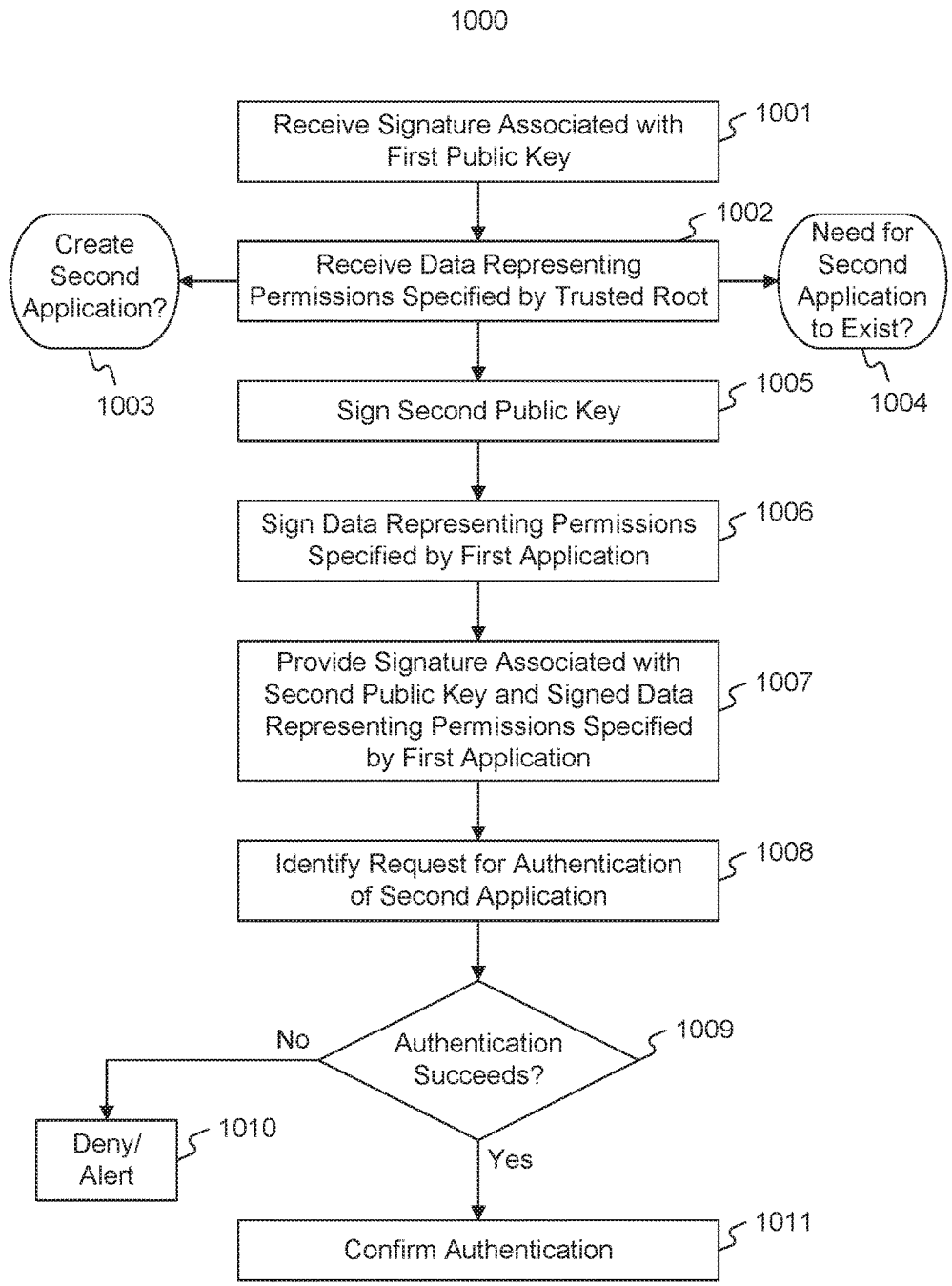
FIG. 10 is a flowchart depicting a chaining process for creating authentication credentials, in accordance with disclosed embodiments.

FIG. 10 is a flowchart depicting an exemplary process 1000 of decentralized and scalable trust among a plurality of decentralized applications. Consistent with the above discussion, process 1000 may be performed in the system environment of FIG. 1, where a trusted root application and one or more decentralized applications (e.g., from FIGS. 2-4) form a cryptographic chain of trust. Process 1000 may include functionality similar to that described in connection with FIG. 5, and may utilize trust tokens such as those illustrated in FIGS. 8-9. As an example, process 1000 may be performed by a first decentralized application, which may be a microservice performing a particular function in a network environment in concert with one or more other microservices (e.g., a web development process, a cybersecurity reporting process, an e-commerce process, etc.).

In an operation 1001, process 1000 may include receiving, at a first decentralized application, a signature associated with a first public key. For example, as discussed above, the first decentralized application may receive a signature created by a trusted root application having complete (or nearly complete) privileges in a network environment. The signature may be the product of a public/private key pair maintained at the trusted root application, where the private key is always maintained securely at the trusted root application and not shared with downstream decentralized applications.

Process 1000 may further include an operation 1002 of receiving, at the first decentralized application, data representing one or more permissions specified by the trusted root application and signed by the trusted root application. For example, in accordance with above embodiments, the trusted root application may specify that it will share some, or all, of its rights, privileges, or other permissions with a first decentralized application. For instance, of the trusted root application is a superuser with all privileges, it may determine to share read, write, copy, modify, and execute privileges with the first decentralized application. The trusted root application may sign such permissions (e.g., as part of a trust token), as discussed above.

In some embodiments, process 1000 further considers, in operation 1003, whether to create a second decentralized application or, in operation 1004, whether a need for a second decentralized application exists. For example, in some embodiments, at the time operation 1002 is performed by the first decentralized application, the second decentralized application may not yet exist. As an illustration, the first decentralized application may be a microservice configured to perform a dedicated function within a website. As demand for the website grows, a network orchestration service may determine to spin up more instances of the website, including the first decentralized application. This may indicate a need to spin up the second decentralized application as a copy of the first decentralized application. Alternatively, because of the increase in demand, it may be determined to spin up the second decentralized application as another microservice that has functionality depending on the first decentralized application. Of course, in other embodiments, at the time operation 1002 is performed, the second decentralized application may also already have been spun up.

In an operation 1005, the first decentralized application may sign a second public key associated with the second decentralized application. For example, as discussed above, the first decentralized application may generate a public/private key pair, and may sign the public key (or a trust token containing the public key), for sending to the second decentralized application. As discussed above, this process may extend the chain of cryptographic trust to the second decentralized application. Further, as discussed above, operation 1006 may involve signing, at the first decentralized application, data representing one or more permissions specified by the first decentralized application. The signing of these permissions may occur as part of the same signing of the public key, or separately. In other words, there may be one resulting digital signature or two, as a result of operations 1005 and 1006. Consistent with above embodiments the permissions specified by the first decentralized application may be all, or a subset, of the privileges that the first decentralized application itself possesses, which were granted to it by the trusted root application. The privileges defined and signed by the first decentralized application may be those that the first decentralized application is sharing or conferring to the second decentralized application.

In an operation 1007, process 1000 may include providing the signature associated with the second public key and the signed data representing one or more permissions specified by the first decentralized application to the second decentralized application. For example, as discussed above, the second public key and permissions may be included in a trust token sent to the second decentralized application. The trust token may, as discussed above, provide trust between the first decentralized application and the second decentralized application.

In particular, as discussed above in connection with FIGS. 6 and 7, the second decentralized application may use the trust token (e.g., as part of an authentication token) to request authentication upstream in the chain of cryptographic trust (e.g., to the first decentralized application). This process of a client application (e.g., second decentralized application) requesting authentication upward in the chain is provided by operations 1008-1011 in process 1000. For example, in operation 1008, a request for authentication of the second decentralized application may be identified. As discussed above, this may be the result of the second decentralized application seeking access to an access-restricted network resource, in response to a periodic security check of the second decentralized application, or in response to another process. Operation 1009 may determine whether the second decentralized application has successfully authenticated itself. In this regard, the authentication stages as discussed in FIGS. 6 and 7 may be performed, whereby the second decentralized application utilizes the trust token that it has received to seek authentication upstream in the cryptographic chain of trust. If the authentication is successful in operation 1009, the success may be confirmed in operation 1011, whereas a failed authentication may result in a denial of access or alert regarding the failure in operation 1010. Notably, process 1000 may be performed in a high scalable, decentralized fashion. Decentralized applications are able to authenticate themselves and their designated privileges through reference to a parent application, without requiring each decentralized application to authenticate itself to a central resource. Thus, as more and more decentralized applications are generated (e.g., as part of a scaling or load balancing process), the authentication process is still allowed to maintain its efficiency and security.

Figure 11:
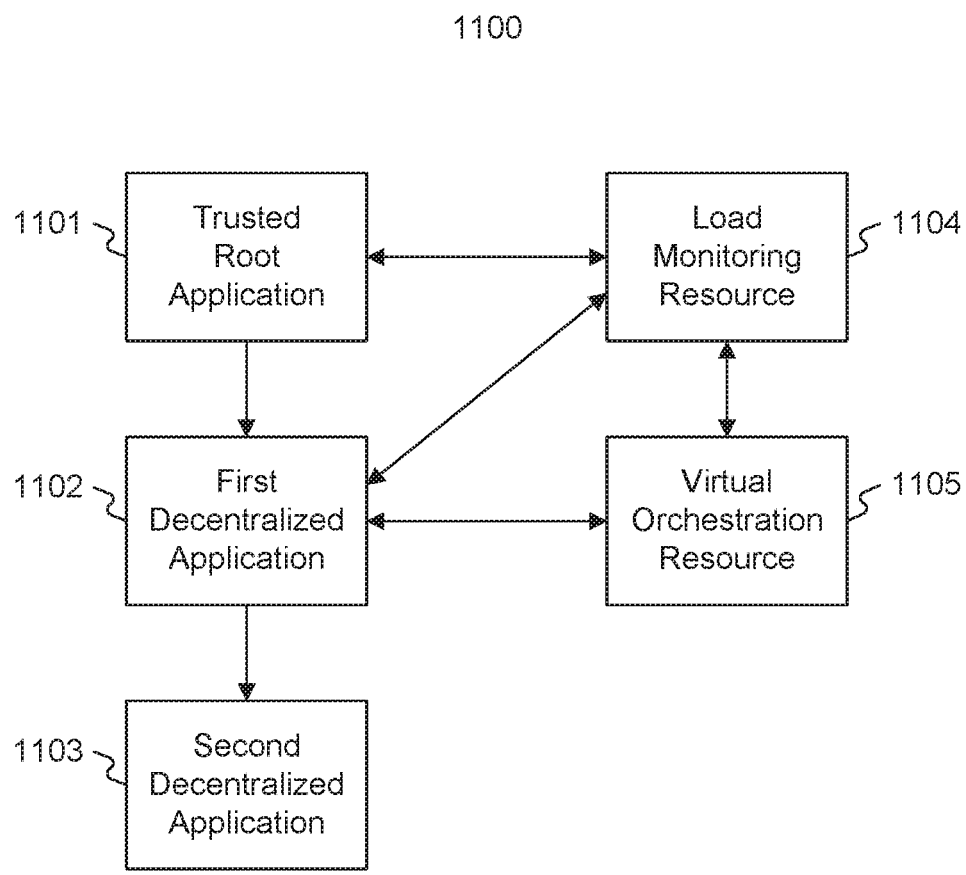
FIG. 11 is an exemplary system diagram depicting system components that may participate in techniques of decentralized and scalable trust among a plurality of decentralized applications, in accordance with disclosed embodiments.

FIG. 11 is an illustration of another exemplary system environment 1100 in which the techniques of decentralized authentication described above may be implemented. As shown in FIG. 11, there may be a trusted root application 1101 (e.g., similar to trusted root application 101 of FIG. 1), first decentralized application 1102 (e.g., similar to first decentralized application 102 of FIG. 1), and second decentralized application 1103 (e.g., similar to second decentralized application 106 of FIG. 1). Of course, there may be many more decentralized applications in parallel with first decentralized application 1102 and second decentralized application 1103, as well as many more child applications (e.g., depending from second decentralized application 1103). As discussed above, trusted root application 1101 may be part of the same network environment as first decentralized application 1102 and second decentralized application 1103, or each may be part of one or more separate networks.

System 1100 may also include a load monitoring resource 1104 and/or a virtual orchestration resource 1105. For example, load monitoring resource 1104 may be configured to monitor or predict network load conditions. Based on such load conditions, load monitoring resource 1104 may instruct for additional decentralized applications to be spun up, or terminated, to meet the observed or predicted load. As an illustration, in a website hosting network environment, load monitoring resource 1104 may be configured to monitor actual, observed network traffic, or to predict (e.g., based on various types of predictive algorithms) anticipated future network traffic. As changes in network traffic for a website are determined by load monitoring resource 1104, load monitoring resource 1104 may instruct trusted root application 1101 to generate trust tokens for additional or fewer instances of first decentralized application 1102, for first decentralized application 1102 to generate trust tokens for additional or fewer instances of second decentralized application 1103, or to generate trust tokens for various parallel decentralized applications. Alternatively, in a virtualized network environment, load monitoring resource 1104 may be configured to report network load activity to virtual orchestration resource 1105, which may in turn be responsible for instructing trusted root application 1101 to generate trust tokens for additional or fewer instances of first decentralized application 1102, or for first decentralized application 1102 to generate trust tokens for additional or fewer instances of second decentralized application 1103.

In further embodiments, virtual orchestration resource 1105 may be configured to independently determine whether and when to instruct that new trust tokens should be generated. For example, virtual orchestration resource 1105 may be responsible for spinning up new application instances in a virtualized environment. Consistent with above examples, virtual orchestration resource 1105 may be a cloud-based orchestration tool such as Chef™, Puppet™, OpenStack™, or others, that are configured to manage the creation and deletion of virtual computing instances. Further, as discussed above, virtual orchestration resource 1105 may be part of a continuous development, continuous deployment, or DevOps, etc., network environment. In some implementations, virtual orchestration resource 1105 may be implemented as part of a continuous development or continuous deployment environment, where new decentralized applications are continuously being created and deleted. Consistent with above embodiments, virtual orchestration resource 1105 may be responsible for determining what decentralized applications in a network environment are to be trusted and what decentralized applications are to receive trust tokens as part of the cryptographic chain of trust.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for decentralized and scalable trust among a plurality of decentralized applications, the operations comprising:
   receiving, at a first decentralized application, a signature associated with a first public key, the signature being created by a trusted root application;
   receiving, at the first decentralized application, data representing one or more permissions specified by the trusted root application and signed by the trusted root application;
   wherein the one or more permissions specified by the trusted root application define one or more access rights of the first decentralized application;
   signing, at the first decentralized application, a second public key associated with a second decentralized application;
   signing, at the first decentralized application, data representing one or more permissions specified by the first decentralized application;
   wherein the one or more permissions specified by the first decentralized application define one or more access rights of the second decentralized application; and
   providing the signature associated with the second public key and the signed data representing one or more permissions specified by the first decentralized application, in order to thereby provide trust between the first decentralized application and the second decentralized application.

2. The non-transitory computer readable medium of claim 1, wherein the data representing one or more permissions specified by the trusted root application are identified in a token provided by the trusted root application.

3. The non-transitory computer readable medium of claim 2, wherein the token further contains the signature associated with the first public key signed by the trusted root application.

4. The non-transitory computer readable medium of claim 1, wherein the operations further comprise identifying, at the first decentralized application, a request for authentication of the second decentralized application.

5. The non-transitory computer readable medium of claim 1, wherein the operations further comprise identifying, at the first decentralized application, a need for the second decentralized application to exist.

6. The non-transitory computer readable medium of claim 1, wherein the data representing one or more permissions specified by the trusted root application are a subset of permissions of the trusted root application.

7. The non-transitory computer readable medium of claim 1, wherein the data representing one or more permissions specified by the first decentralized application are a subset of permissions of the first decentralized application.

8. The non-transitory computer readable medium of claim 1, wherein the trusted root application is configured to determine whether to trust the first decentralized application before signing the first public key.

9. The non-transitory computer readable medium of claim 1, wherein the first decentralized application is configured to determine whether to trust the second decentralized application before signing the second public key.

10. The non-transitory computer readable medium of claim 1, wherein the operations further comprise generating, at the first decentralized application, the second public key.

11. The non-transitory computer readable medium of claim 1, wherein the operations further comprise receiving, at the first decentralized application from a source external to the first decentralized application, the second public key.

12. The non-transitory computer readable medium of claim 1, wherein the operations further comprise generating a token specifying: the second public key and the data representing one or more permissions specified by the first decentralized application.

13. The non-transitory computer readable medium of claim 1, wherein the first decentralized application and second decentralized application are part of a chain of trust, and wherein the chain of trust does not include certain other decentralized applications from the plurality of decentralized applications.

14. A computer-implemented method for decentralized and scalable trust among a plurality of decentralized applications, the method comprising:

receiving, at a first decentralized application, a signature associated with a first public key, the signature being created by a trusted root application;

receiving, at the first decentralized application, data representing one or more permissions specified by the trusted root application and signed by the trusted root application;

wherein the one or more permissions specified by the trusted root application define one or more access rights of the first decentralized application;

signing, at the first decentralized application, a second public key associated with a second decentralized application;

signing, at the first decentralized application, data representing one or more permissions specified by the first decentralized application;

wherein the one or more permissions specified by the first decentralized application define one or more access rights of the second decentralized application; and providing the signature associated with the second public key and the signed data representing one or more permissions specified by the first decentralized application, in order to thereby provide trust between the first decentralized application and the second decentralized application.

15. The computer-implemented method of claim 14, wherein the first decentralized application is configured to receive an authentication request from the second decentralized application.

16. The computer-implemented method of claim 15, wherein the authentication request includes the signed second public key and the signed data representing one or more permissions specified by the first decentralized application.

17. The computer-implemented method of claim 16, further comprising validating the signature associated with the second public key.

18. The computer-implemented method of claim 17, further comprising determining, based on the validating, whether to authenticate the second decentralized application.

19. The computer-implemented method of claim 14, wherein the data representing one or more permissions specified by the trusted root application are identified in a first token provided by the trusted root application.

20. The computer-implemented method of claim 19, further comprising generating a second token specifying: the second public key and the data representing one or more permissions specified by the first decentralized application.

21. The computer-implemented method of claim 20, further comprising validating, at the first decentralized application, the first token and the second token.

22. The computer-implemented method of claim 14, wherein the first decentralized application and second decentralized application are part of a chain of trust, and wherein the chain of trust does not include certain other decentralized applications from the plurality of decentralized applications.

* * * * *